United States Patent
Rodawold, Jr.

(10) Patent No.: US 6,826,805 B2
(45) Date of Patent: Dec. 7, 2004

(54) COLLAPSIBLE CONTROL KNOB

(75) Inventor: Joseph L. Rodawold, Jr., Wilmington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/328,972

(22) Filed: Dec. 24, 2002

(65) Prior Publication Data
US 2003/0163903 A1 Sep. 4, 2003

Related U.S. Application Data
(60) Provisional application No. 60/360,781, filed on Mar. 1, 2002.

(51) Int. Cl.[7] .............................................. A47B 95/02
(52) U.S. Cl. ........................ 16/441; 16/433; 16/DIG. 41
(58) Field of Search ................... 16/411, 433, DIG. 40, 16/DIG. 41, DIG. 24, DIG. 30; 74/553; 362/26, 27; 403/252, 254, 255, 243, 300

(56) References Cited

U.S. PATENT DOCUMENTS

| 2,574,330 | A | * | 11/1951 | Judd | 403/107 |
|---|---|---|---|---|---|
| 3,016,686 | A | * | 1/1962 | Fox | 368/316 |
| 3,329,452 | A | * | 7/1967 | Bruno | 403/276 |
| 3,338,604 | A | * | 8/1967 | Buren, Jr. | 403/280 |
| 3,805,637 | A | * | 4/1974 | Keeling, Jr. | 74/553 |
| 4,050,265 | A | * | 9/1977 | Drennen et al. | 464/96 |
| 4,127,342 | A | * | 11/1978 | Coggiola | 403/243 |
| 4,295,246 | A | * | 10/1981 | Howie, Jr. | 16/441 |
| 5,537,893 | A | * | 7/1996 | Snider | 74/553 |
| 5,857,242 | A | | 1/1999 | Pizzo et al. | 16/121 |
| 6,003,206 | A | * | 12/1999 | Hall et al. | 16/441 |
| 6,073,312 | A | * | 6/2000 | Dao et al. | 16/441 |
| 6,102,608 | A | * | 8/2000 | Hogan et al. | 403/300 |

FOREIGN PATENT DOCUMENTS

| DE | 2914280 A | * | 10/1980 | ............ H01H/3/02 |
|---|---|---|---|---|
| DE | 2941626 A | * | 4/1981 | ........... B60K/37/06 |

* cited by examiner

Primary Examiner—Chuck Y. Mah
(74) Attorney, Agent, or Firm—Mark W. Croll; Paul F. Donovan

(57) ABSTRACT

A collapsible control knob assembly includes a knob having a tunnel therein for receiving a shaft. Stops in the tunnel are configured and arranged to cooperatively stop the insertion of the shaft during assembly. The stops are configured and arranged to shear from the tunnel when a pre-established collapsing force is exceeded.

19 Claims, 2 Drawing Sheets

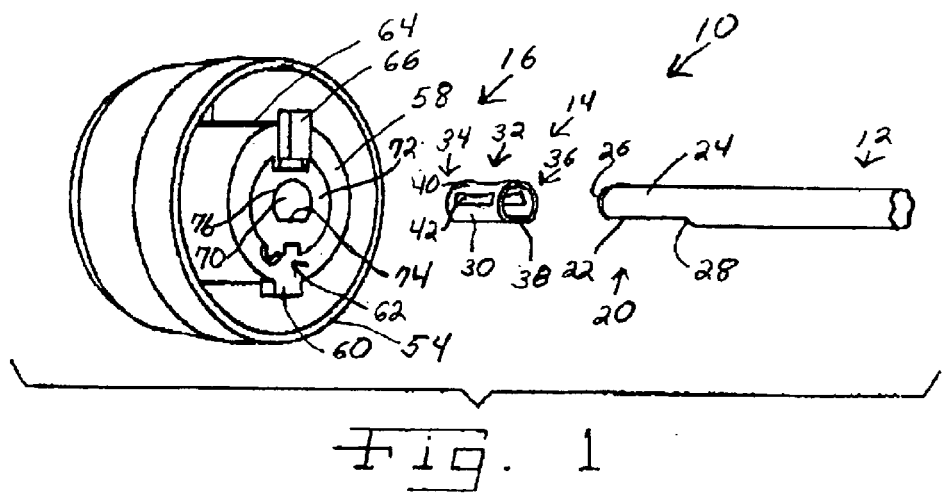
Fig. 1
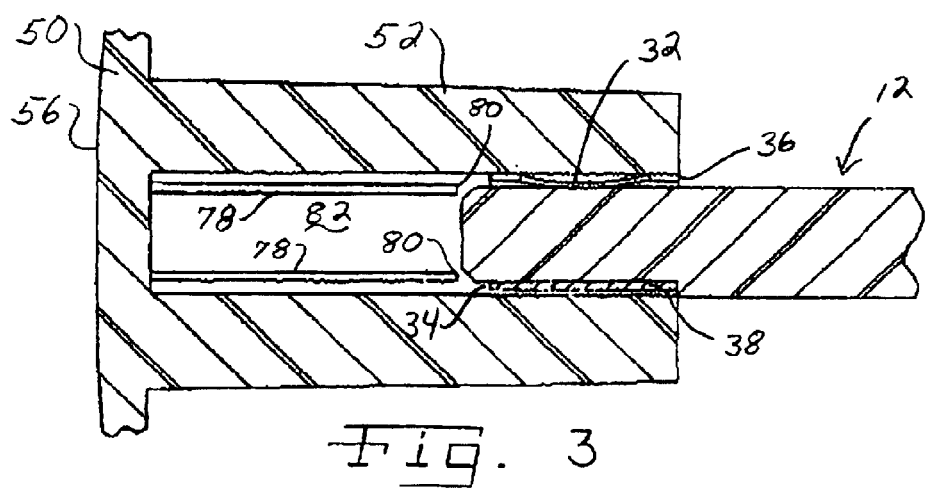
Fig. 2
Fig. 3

COLLAPSIBLE CONTROL KNOB

CROSS REFERENCE TO RELATED APPLICATION

This Non-Provisional Application claims benefit to U.S. Provisional Application Ser. No. 60/360,781 filed Mar. 1, 2002.

FIELD OF THE INVENTION

The present invention relates generally to control knobs that typically are used on control panels in automobiles, and, more particularly, to collapsing control knob assemblies having control knobs.

BACKGROUND OF THE INVENTION

The automobile industry continually strives to produce safer and more reliable vehicles. Safety features are being incorporated into all subsystems and components of the automobile. At the same time, automakers continually strive to develop more styles, appearances and convenience features to make their products unique in comparison to those of competitors. While improving safety is a constant, primary concern, the competing desires of safety and styling are often in conflict with each other. Thus, automobile designers are asked to design vehicle components that promote safety and convenience and yet must be aesthetically pleasing to the consumer. To please a variety of customers, different design offerings are necessary.

Many safety standards in the automobile industry are intended to improve crash-worthiness of a vehicle, and to prevent, or at least minimize, injuries that may occur to occupants in the event of a crash. One such standard requires that all components on the automobile dashboard collapse in the event of an impact collision. After collapse, no sharp edges can be present, and all control knobs, buttons and the like should protrude only minimally from the surface. A current standard limits the allowable protrusion of knobs or controls to nine millimeters or less. The collapsing action of the dashboard and its components is sometimes referred to as "homoligation". To meet this standard over all, any and all components such as air control heads that contain buttons or knobs, and other dashboard subsystems must individually meet the collapsing requirement.

To meet the standards limiting maximum protrusion of dashboard components, some automobile designers have reduced or even eliminated the use of rotary knobs that must collapse in the event of a crash. Depressible switches in the form of pads are used to toggle through, and select from the various functions that are controlled by the switch. A control panel having only depressible pads readily meets the maximum protrusion standards; however, some consumers find the appearance unpleasing, and the use of touchpad controls difficult, particularly by the driver while driving.

It is known to provide collapsing or telescoping buttons or knobs on control shafts. In one known construction, a D-shaft is received in a D-shaped opening of a control knob. The D-shaped opening in the knob is sufficiently deep, and the D-shaped portion of the shaft is sufficiently long that, upon a collision or other collapsing impact, the knob is shoved further onto the shaft, to reduce protrusion of the knob. While this design meets the collapsing requirements, it is necessary that the shape of the knob and the shape of the shaft are complementary. Further, the shaped portion of the shaft must be of sufficient length for the knob to slide further on during a crash. Thus, it is necessary to stock different style knobs for each style shaft used on control items, and to provide shafts having long knob receiving end segments sufficient for the knob to be used. A further problem with this design occurs during normal assembly. Without incorporating the collapsing feature, the length of the D-shaped portion of the shaft is only as long as necessary to receive the knob thereon. During assembly, the knob is slid onto the shaft until it will progress no farther. A natural "stop" is provided, making it easy to install all knobs to the proper depth. By allowing extra room for collapse, it becomes necessary to otherwise control the depth to which the knob is installed.

What is needed is a collapsing control having a knob adapted for use on shafts of standard types, but with the knob incorporating the collapsing feature required to meet safety standards.

SUMMARY OF THE INVENTION

The present invention provides a collapsible control knob assembly in which a control knob has stops establishing a fixed position of the knob on the shaft during assembly, with the stops being severable during a crash to collapse the control knob assembly.

In one aspect thereof, the present invention provides a collapsible control knob assembly with a shaft having a distal end and an end portion inwardly of the distal end. A knob has a head and a trunk, the trunk extending outwardly from the head and having a tunnel therein defined by a tunnel surface. The tunnel has an opening at an end of the trunk opposite the head. The tunnel is adapted to receive the end portion of the shaft. The tunnel has at least one rib extending radially inwardly from the tunnel surface. The rib has a rib end inwardly in the tunnel from the opening adapted to abut the shaft. The shaft is adapted to shear the at least one rib from the tunnel surface when a force from a collapsing event exceeds a pre-established limit, forcing the shaft and the knob toward each other.

In another aspect thereof, the present invention provides a collapsible control knob assembly with a shaft having an end and an end portion, and a knob slidable over the end portion. At least one stop in the knob abuts the shaft end. Shearing means shears the stop upon a compressive force between the shaft and the knob exceeding a selected limit.

In a further aspect thereof, the present invention provides an automobile control knob with a head, a trunk connected to the head, a tunnel in the trunk and at least one shearable stop disposed in the tunnel.

An advantage of the present invention is providing a collapsible control knob assembly that is easy to assemble.

A further advantage of the present invention is providing a collapsible control knob that operates with common shaft designs, and does not require special shaft configurations for proper homoligation.

Still another advantage of the present invention is providing a collapsible control knob design that is adaptable for manufacture to withstand different force limits without collapsing.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is an exploded perspective view of a collapsible control knob assembly according to the present invention;

FIG. 2 is an end view of the control knob shown in FIG. 1;

FIG. 3 is a cross sectional view of the assembled control knob assembly, taken along line 3—3 of FIG. 2.

Figure 4:
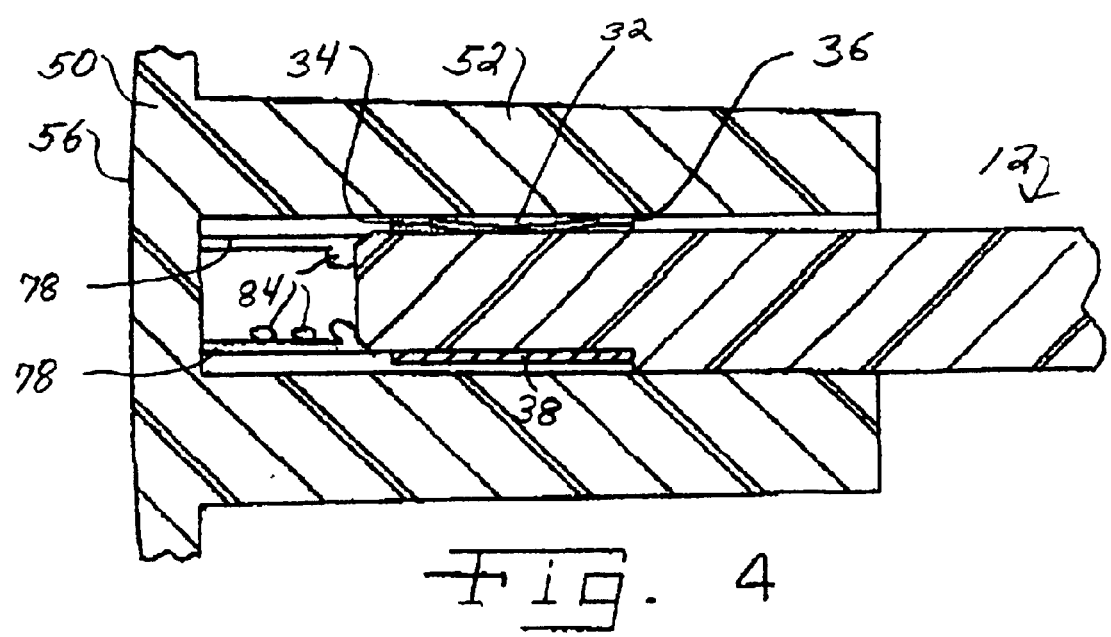
FIG. 4 is a cross sectional view similar to FIG. 3, but illustrating the control knob assembly in a collapsed condition.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1, in particular, a collapsible control knob assembly 10 according to the present invention is shown. Control knob assembly 10 includes a shaft 12, a spring sleeve 14 and a knob 16.

Control knob assembly 10 is connected to a component of a subsystem for which control knob assembly 10 is provided for operational control and input. For example, control knob assembly 10 may be connected to a blower motor control for controlling the blower motor speed, or may be an environmental control system mode selector switch. However, those skilled in the art will understand that control knob assembly 10 can be used as well on other automobile subsystems and/or in applications other than automobiles.

Shaft 12 preferably is of plastic, and includes an end portion 20 having a substantially D-shaped cross section including a flattened segment 22 and an arcuate segment 24. End portion 20 extends inwardly from a distal end 26 of shaft 12 a distance sufficient to receive spring sleeve 14 thereon. Opposite from distal end 26, flattened segment 22 of end portion 20 terminates at a ledge 28. Essentially, ledge 28 is formed at the abrupt transition from flattened segment 22 to the rounded configuration of shaft 12 inwardly from end portion 20.

Spring sleeve 14 is a substantially hollow metal body 30 having a narrowed waist or center portion 32 and slightly wider first and second ends 34 and 36, respectively. Spring sleeve 14 is also D-shaped in cross-section, having a substantially flat portion 38 and an arcuate portion 40, each extending the length of spring sleeve 14. One or more relief slots 42 are provided axially in spring sleeve 14.

As seen most clearly in FIG. 3, spring sleeve 14 fits on end portion 20 of shaft 12. When assembled on shaft 12, second end 36 of spring sleeve 14 abuts against ledge 28 of shaft 12, such that spring sleeve 14 is inhibited from sliding further onto shaft 12, away from distal end 26.

Knob 16 includes a head 50, a trunk 52 and an outer shell 54 typically cast as a monolithic structure from plastic or the like. Head 50 includes an outer face 56, with outer shell 54 depending away therefrom at the peripheral edge of outer face 56. Shell 54 may be provided with knurls, ridges or other outer surface treatment for easy grasping by an individual using control knob assembly 10.

Knob 16 is provided with a hub 58, substantially annular in shape and disposed on trunk 52. Hub 58 is received in a device (not shown) for which control knob assembly 10 is provided for operator input. Hub 58 can thereby provide a bearing surface for rotation of knob assembly 10 in the device (not shown). A key 60 provided at the peripheral edge of hub 58 engages a keyway (not shown) in the device (not shown) for securing knob assembly 10 in proper position, and for providing a positive driving engagement between hub 58 and the device (not shown). Interlocking projections 62 are provided between trunk 52 and hub 58, and provide positive driving connection between trunk 52 and hub 58, such that rotation of shell 54 results in rotation of hub 58. Hub 58 is further provided with a jewel light pipe 64 of tinted polycarbonate or the like, which includes a tail 66 for collecting light from a light source such as, for example, an automobile dashboard and transmitting the light to a slot (not shown) in outer face 56. The visible strip of light in outer face 56 is used as an indicator or index device for referencing a position of knob 16 as adjustments are made during control operation. Key 60 or tail 66 can also function as a knob stop to inhibit rotation to a previously determined range.

Trunk 52 includes a D-shaped tunnel 70 therein, extending inwardly from an end 72 of trunk 52 opposite head 50. Tunnel 70 is D-shaped similarly to shaft 12 and spring sleeve 14, thereby having a flattened portion 74 and an arcuate portion 76. Tunnel 70 is sized and shaped to receive end portion 20 of shaft 12 with spring sleeve 14 disposed on shaft 12. The nature and shape of spring sleeve 14 on shaft 12 provides a relatively strong frictional engagement between the assembled components, as illustrated in FIG. 3, so that the assembly of shaft 12, spring sleeve 14 and knob 16 does not pull apart easily.

As seen most clearly in FIG. 2, tunnel 70 is provided with one or more axial extending ribs 78 therein. Each rib 78 has a rib end 80 (FIG. 3) spaced inwardly in tunnel 70 from end 72, and forms a stop in tunnel 70. Thus, with the end 36 of spring 14 in contact with ledge 28 of shaft 12, rib or ribs 78 indirectly inhibit further insertion of shaft 12, when first end 34 of spring sleeve 14 abuts ends 80 of ribs 78 as control knob assembly 10 is assembled. Ribs 78 thereby initially provide a positive stop for consistent positioning of knobs 16 on shafts 12 in an assembly line or other assembly process.

Ribs 78 extend radially inwardly in tunnel 70, but rise only slightly above an inner surface 82 of tunnel 70, normally no more than about the thickness of the metal in spring sleeve 14. From rib end 80, rib 78 extends axially along tunnel 70 a significant distance, and may extend the entire remaining distance of tunnel 70. Rib or ribs 78 are formed monolithically with trunk 52 such that a single structure is made including head 50, trunk 52 and shell 54, with ribs 78 in tunnel 70 formed in trunk 52.

When relative compressive force is applied between knob 16 and shaft 12, spring sleeve 14 shears the one or more ribs 78 away from inner surface 82 of tunnel 70. As illustrated in FIG. 4, the sheared away material of ribs 78 accumulates ahead of shaft 12 in tunnel 70. Even when relative compressive force is applied between shaft 12 and knob 16, spring sleeve 14 remains in position on shaft 12 in that second end 36 thereof abuts against ledge 28 on shaft 12.

To provide ready, quick shearing of ribs 78 away from inner surface 82 of tunnel 70, ribs 78 are narrow in both the circumferential and radial directions of tunnel 70. That is, a cross section of each rib 78 is relatively small. However, even without adjusting the dimensions of ribs 78 the relative resistance to collapse of control knob assembly 10 can be altered by providing more or fewer ribs 78. Thus, if collapse is to occur at minimal compressive force, only one or several ribs 78 may be provided. However, on the other hand, if control knob assembly 10 is to withstand higher levels of force before collapse occurs, more ribs 78 are provided.

In the use of control knob assembly 10 according to the present invention, flat and arcuate portions 38 and 40 of spring sleeve 14 are aligned with flattened and arcuate portions 22 and 24 of shaft 12. Spring sleeve 14 is inserted onto shaft 12 at end portion 20 of shaft 12, and is slid therealong until second end 36 of spring sleeve 14 abuts against ledge 28 of shaft 12. Alternatively, the spring sleeve 14 can be first positioned in the knob and then the shaft 12 is slid or presses into the sleeve 14. The assembled shaft and spring sleeve are then inserted in tunnel 70 of knob 16, again by aligning the respective flattened and arcuate portions 74 and 76 of knob 16 with the corresponding portions of assembled shaft 12 and spring sleeve 14. Knob 16 is slid onto the outer surface of spring sleeve 14 until resistance to further insertion is encountered. Thus, ends 80 of ribs 78 provide an abutment against which further insertion is inhibited. By providing a positive stop for assembly, assembly is simplified, and assembly consistency is achieved.

If a compressive event occurs, forcing shaft 12 and knob 16 toward each other, rib or ribs 78 are sheared away from inner surface 82 by spring sleeve 14. The small amount of material of each rib 78 sheared from surface 82 is accumulated ahead of shaft 12 as fragments 84, even as shaft 12 is forced further into tunnel 70. A collapsed condition of control knob assembly 10 is illustrated in FIG. 4.

The present invention provides a collapsible knob assembly that functions with common shaft configurations and provides a positive stop for proper assembly of a knob on a shaft. However, upon a compressive event such as during a crash, the positive stops are overcome and collapse of the assembly occurs.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A collapsible control knob assembly, comprising;
a shaft having a distal end and an end portion inwardly of said distal end; and
a knob having a head and a trunk, said trunk extending outwardly from said head and having a tunnel therein defined by a tunnel surface;
said tunnel having an opening at an end of said trunk opposite said head;
said tunnel being adapted to receive said end portion of said shaft;
said tunnel having at least one rib extending radially inwardly from said tunnel surface and having a rib end inwardly in said tunnel from said opening, said rib end adapted to abut said shaft;
said shaft adapted to shear said at least one rib from said tunnel surface when a force from a collapsing event exceeds a pre-established limit, forcing said shaft and said knob toward each other.

2. The collapsible control knob assembly of claim 1, including at least two said ribs.

3. The collapsible control knob assembly of claim 1, said shaft end portion being D-shaped in cross section.

4. The collapsible control knob assembly of claim 3, said shaft having a spring sleeve disposed on said end portion.

5. The collapsible control of claim 4, said spring sleeve being a hollow body and said at least one rib having a height substantially similar to a thickness of said spring sleeve body.

6. The collapsible control of claim 1, said knob, said trunk and said ribs being a monolithic structure.

7. The collapsible control of claim 6, said knob including a shell outwardly of said tunnel.

8. A collapsible control knob assembly, comprising;
a shaft having an end and an end portion;
a knob slidable over said end portion;
at least one stop in said knob for abutting said shaft end, said at least one stop being at least one rib being monolithic with said knob; and
shearing means for shearing said at least one stop upon a compressive force between said shaft and said knob exceeding a selected limit.

9. The collapsible control of claim 8 having at least two said stops.

10. The collapsible control of claim 8, wherein the shearing means is a spring sleeve on said shaft.

11. The collapsible control of claim 10, said shaft end portion and said spring sleeve being D-shaped in cross section.

12. An automobile control knob comprising;
a head;
a trunk connected to said head, said trunk having a tunnel therein; and
at least one shearable stop disposed in said tunnel, said stop being a rib extending axially along said tunnel and having a rib end spaced inwardly in said tunnel.

13. The automobile control knob of claim 12, said head and said trunk being a monolithic structure.

14. The automobile control knob of claim 12, including at least two said stops.

15. The automobile control knob of claim 12, said tunnel being D-shaped in cross section, having a flattened portion and an arcuate portion.

16. The automobile control knob of claim 15, said head and said trunk being a monolithic structure.

17. The automobile control knob of claim 16, said at least one stop being a rib extending axially along said tunnel, said rib having a rib end spaced inwardly in said tunnel.

18. The automobile control knob of claim 17 including at least two said ribs.

19. A collapsible control knob assembly, comprising;
a shaft having a distal end and an end portion inwardly of said distal end, said end portion being D-shaped in cross section;
a spring sleeve disposed on said end portion, said spring sleeve have a hollow body and also being D-shaped in cross section; and
a knob having a head and a trunk, said trunk extending outwardly from said head and having a tunnel therein defined by a tunnel surface, said tunnel having an opening at an end of said trunk opposite said head, said tunnel being adapted to receive said end portion of said shaft, said tunnel having at least one rib extending radially inwardly from said tunnel surface and having a rib end inwardly in said tunnel from said opening, said at least one rib having a height substantially similar to a thickness of said spring sleeve body, said rib end adapted to abut said spring sleeve, said spring sleeve adapted to shear said at least one rib from said tunnel surface when a force from a collapsing event exceeds a pre-established limit, forcing said shaft and said knob toward each other.

* * * * *